United States Patent
Kobayashi et al.

(10) Patent No.: US 10,712,092 B2
(45) Date of Patent: Jul. 14, 2020

(54) REDUCTION OF REGENERATOR CLOGGING

(71) Applicants: Hisashi Kobayashi, Bedford, NY (US); Kuang-Tsai Wu, Irvine, CA (US)

(72) Inventors: Hisashi Kobayashi, Bedford, NY (US); Kuang-Tsai Wu, Irvine, CA (US)

(73) Assignee: Praxair Technology, Inc., Danbury, CT (US)

(*) Notice: Subject to any disclaimer, the term of this patent is extended or adjusted under 35 U.S.C. 154(b) by 110 days.

(21) Appl. No.: 15/934,245

(22) Filed: Mar. 23, 2018

(65) Prior Publication Data

US 2018/0283789 A1 Oct. 4, 2018

Related U.S. Application Data

(60) Provisional application No. 62/478,199, filed on Mar. 29, 2017.

(51) Int. Cl.
| | |
|---|---|
| F23L 15/02 | (2006.01) |
| F27D 17/00 | (2006.01) |
| F27B 3/26 | (2006.01) |
| F23L 15/04 | (2006.01) |
| C03B 3/02 | (2006.01) |
| C03B 5/235 | (2006.01) |
| C03B 5/237 | (2006.01) |
| C01B 3/46 | (2006.01) |
| F28D 20/00 | (2006.01) |

(52) U.S. Cl.
CPC ............... *F27B 3/266* (2013.01); *C01B 3/46* (2013.01); *C03B 3/023* (2013.01); *C03B 5/237* (2013.01); *C03B 5/2353* (2013.01); *F23L 15/045* (2013.01); *F27D 17/004* (2013.01); *F27D 17/008* (2013.01); *F23K 2900/01041* (2013.01); *F23L 2900/07005* (2013.01); *F27D 2017/007* (2013.01); *F28D 20/003* (2013.01); *Y02P 40/535* (2015.11)

(58) Field of Classification Search
CPC ...... F23J 15/022; C03B 5/237; C03B 5/2375; C10J 3/84; C10L 3/00; C01B 2203/0827; C01B 2203/141; F27D 2017/007; F23G 7/068; F23L 15/04
See application file for complete search history.

(56) References Cited

U.S. PATENT DOCUMENTS

| | | | | |
|---|---|---|---|---|
| 2,845,335 A * | 7/1958 | Hasche | ............... | F28D 17/04 422/206 |
| 6,113,874 A * | 9/2000 | Kobayashi | ............... | C01B 3/34 252/373 |
| 9,541,290 B2 * | 1/2017 | Iyoha | ............... | F23L 7/007 |
| 2016/0370005 A1 * | 12/2016 | Wu | ............... | C10J 3/82 |
| 2017/0121206 A1 | 5/2017 | Kobayashi | | |

FOREIGN PATENT DOCUMENTS

WO 2018/013455 A1 1/2018

OTHER PUBLICATIONS

A. Gonzalez et al, Optimelt(TM) Regenerative Thermo-Chemical Heat Recovery for Oxy-Fuel Glass Furnaces, 75th Conference on Glass Problems, Apr. 8, 2015, p. 113-120, John Wiley & Sons, Inc., Hoboken, NJ, USA.

* cited by examiner

*Primary Examiner* — Gregory A Wilson
(74) *Attorney, Agent, or Firm* — Donald T. Black

(57) ABSTRACT

A thermochemical regenerator system is operated without encountering accumulation of unwanted solids on the interior surfaces of the passages through which flue gas passes.

18 Claims, 7 Drawing Sheets

REDUCTION OF REGENERATOR CLOGGING

RELATED APPLICATIONS

This application claims the benefit of U.S. Provisional Application Ser. No. 62/478,199, filed on Mar. 29, 2017, which is incorporated herein by reference.

FIELD OF THE INVENTION

The present invention relates to heat recovery from furnaces and the like by the use of a waste heat recovery device such as regenerators. It particularly relates to improved methods of heat recovery that avoid customary drawbacks associated with use of regenerators.

BACKGROUND OF THE INVENTION

Heat recovery regenerators have been used in many industries for many decades to recover usable heat from high temperature exhaust streams mainly for the purpose of reducing fuel consumption. One familiar application for heat recovery using regenerators is in air fired glass melting furnaces. Some typical types of regenerators use stacks of refractory checkers which are supported by an arch and enclosed in a refractory enclosure having an opening at both ends for the high temperature gas formed in the furnace to pass through. The hot gas enters the regenerator one end (usually located at the top) and exits from the other end (usually located at the bottom) at a lower temperature as part of the heat content of the exhaust gas is transferred to and stored in the checkers. After the checkers are sufficiently heated the regenerator undergoes so called reversal in which hot gas flow through the regenerator is stopped and combustion air (to be combusted with fuel in the furnace) enters the regenerator bottom and then exits at the top of the regenerator, having been preheated in the regenerator, and is then fed into the furnace for combustion with fuel in the furnace. Typical time between the reversals is about 20 to 30 minutes for regenerators used for glass melting furnaces. The temperature of the preheated combustion air may reach 1250 to 1350 C depending on several factors such as age, maintenance, and the design of the regenerator. Rotary regenerators are another type of heat recovery devices, in which the hot and the cold gas streams flow counter-currently in their own ducts toward segmented heat-storage mediums installed in a rotating device. Heat exchange is accomplished when the heat storage mediums are rotated alternatively between the hot and the cold fluids. In this case the heat storage mediums can be materials made of for example metal ribbons, wire screens, refractory honeycombs, or ceramic balls. This type of regenerators is used in the steel industry and in utility boilers for air preheating.

One difficulty associated with the operation of the heat recovery regenerators is that when the high temperature flue gas stream comprises condensable alkalis, sulfate and/or carbonate salts may form as the hot exhaust gas is being cooled in the regenerator. For example, hot flue gases from a glass furnace may have vapor species containing sodium or potassium such as NaOH, KOH and NaBO2 which originate from molten glassmelt, glass making batch materials, and also sulfur dioxide which is a common component from fossil fuel combustion. During cooling of flue gas, at a temperature in the range of approximately 800 to 1100 C, salts such as $Na_2SO_4$ and $K_2SO_4$ may form from gaseous alkali vapors, sulfur dioxide and oxygen and condense from the flue gases in liquid form, and other fine solid materials present in the flue gases such as batch carryover may adhere to the checker surfaces as liquid or solid deposits. If these deposits are not removed or cleaned over a long period of time, the gas passages in the checker passageways within the regenerator may be increasingly blocked which can eventually result in a partially or substantially plugged regenerator.

A plugged regenerator presents serious challenges to furnace operators in maintaining production rate and in keeping regular maintenance schedules. Narrowed checker passages reduce air flow capacity passing through a regenerator because the pressure side of the blower for moving the combustion air has a design limit. In addition, the deposits on checker surfaces hinder heat transfers both from the hot gas to the checker and from the checker to the air which is to be preheated. Air preheat temperature from a plugged regenerator can be lower than normal. Lower available air flow capacity may force operators to reduce glass pull rate because fuel has to be reduced to match the available air flows, therefore suffer economic losses. Furthermore, lower air preheat temperature results in lower flame temperature in the furnace, which in some situations may induce operational issues such as the quality of glass formed in the furnace. Needless to say a plugged regenerator also reduces heat recovery from the hot gas, and thus specific energy consumption (i.e., energy usage per ton of glass or other product melted or formed in the furnace) can increase which reduces the operator's profit margin.

A plugged regenerator used in glassmelting furnaces is typically cleaned periodically, typically once or twice a year. A common method is "thermal cleaning", in which the temperature of the checker pack of the plugged regenerator is increased to a sufficiently high level to melt down the deposits. Melted deposits are collected at the bottom of the regenerator chamber and removed. An additional heat generating source such as an oxy-fuel burner is often used in the bottom space below the checker pack to increase the checker pack temperature. It is a delicate and slow operation conducted over a few days as overheating can potentially damage or collapse the checker pack. During such cleaning operation the plugged regenerator is partially cleaned and the thermal efficiency is partially restored. However, the cleaning operation interrupts the normal operation of the glass furnace and results in a production loss. There is a need to develop an improved heat recovery process that prevents the plugging of regenerator passages by deposits build up.

BRIEF SUMMARY OF THE INVENTION

The present invention overcomes the previously encountered drawbacks associated with regenerator use, and provides numerous advantages not previously thought to be available.

One aspect of the present invention is a combustion method comprising (A) combusting fuel and gaseous oxidant in a furnace to generate heat of combustion which heats a charge in the furnace and generate gaseous combustion products which include alkali vapor species, (B) passing a gaseous flue gas stream comprising gaseous combustion products from the furnace through a first passageway in a heat recovery device wherein the first passageway has surfaces exposed to the flue gas stream, to heat the surfaces and cool the flue gas stream, and forming liquid or solid deposits on the surfaces by interaction between components of the combustion products, and passing cooled depleted flue gas out of the first passageway, (C) discontinuing passage of the flue gas stream through the first passageway and then passing a gaseous reducing stream through the first passageway in the direction opposite to the flow direction of the flue gas stream in contact with said deposits to react the gaseous reducing stream with the deposits and thereby causing removal of deposits from the surfaces and forming in the first passageway a gaseous byproduct stream comprising products of reaction of the deposits with the reducing stream, and (D) passing the byproduct stream from the first passageway into the furnace and combusting reducing components in said byproduct stream in the furnace.

In another preferred embodiment of this invention, the gaseous reducing stream is produced by passing a gaseous flue gas stream comprising gaseous combustion products from the furnace through a second passageway in a heat recovery device wherein the second passageway has surfaces exposed to the flue gas stream to heat the surfaces and cool the flue gas stream, passing cooled depleted flue gas out of the second passageway, and combining cooled depleted flue gas from the second passageway with fuel.

In yet another preferred embodiment of this invention, the following steps (i) and (ii) are alternatingly carried out, wherein (i) the gaseous reducing stream is produced by (a) passing a gaseous flue gas stream from the furnace which comprises gaseous combustion products including alkali vapor species through a second passageway in a heat recovery device wherein the second passageway has surfaces exposed to the flue gas stream, to heat the surfaces and cool the flue gas stream, and forming liquid or solid deposits on the surfaces in said second passageway by interaction between components of the combustion products, and passing cooled depleted flue gas out of the second passageway, and (b) combining a portion of the cooled depleted flue gas from the second passageway with fuel; wherein the gaseous byproduct stream passed from the first passageway comprises carbon monoxide and hydrogen formed in an endothermic reaction in the first passageway; and (ii) cooled depleted flue gas passed out of the first passageway is combined with fuel and passed into and through the second passageway in contact with said deposits on surfaces in said second passageway, and reacts with the deposits thereby causing removal of deposits from the surfaces, and forms in the second passageway a gaseous byproduct stream comprising products of reaction of the deposits with the reducing stream and comprising carbon monoxide and hydrogen formed in an endothermic reaction in the passageway.

As used herein, "condensed" deposits may be in the solid or liquid phase, or may be a mixture of solid and liquid materials.

A "heat recovery device" includes regenerators, recuperators, and heat exchangers known as batch or cullet preheaters in which glassforming materials being fed to the furnace are preheated by indirect heat exchange with hot combustion gases exiting the furnace.

DETAILED DESCRIPTION OF THE INVENTION

Figure 1:
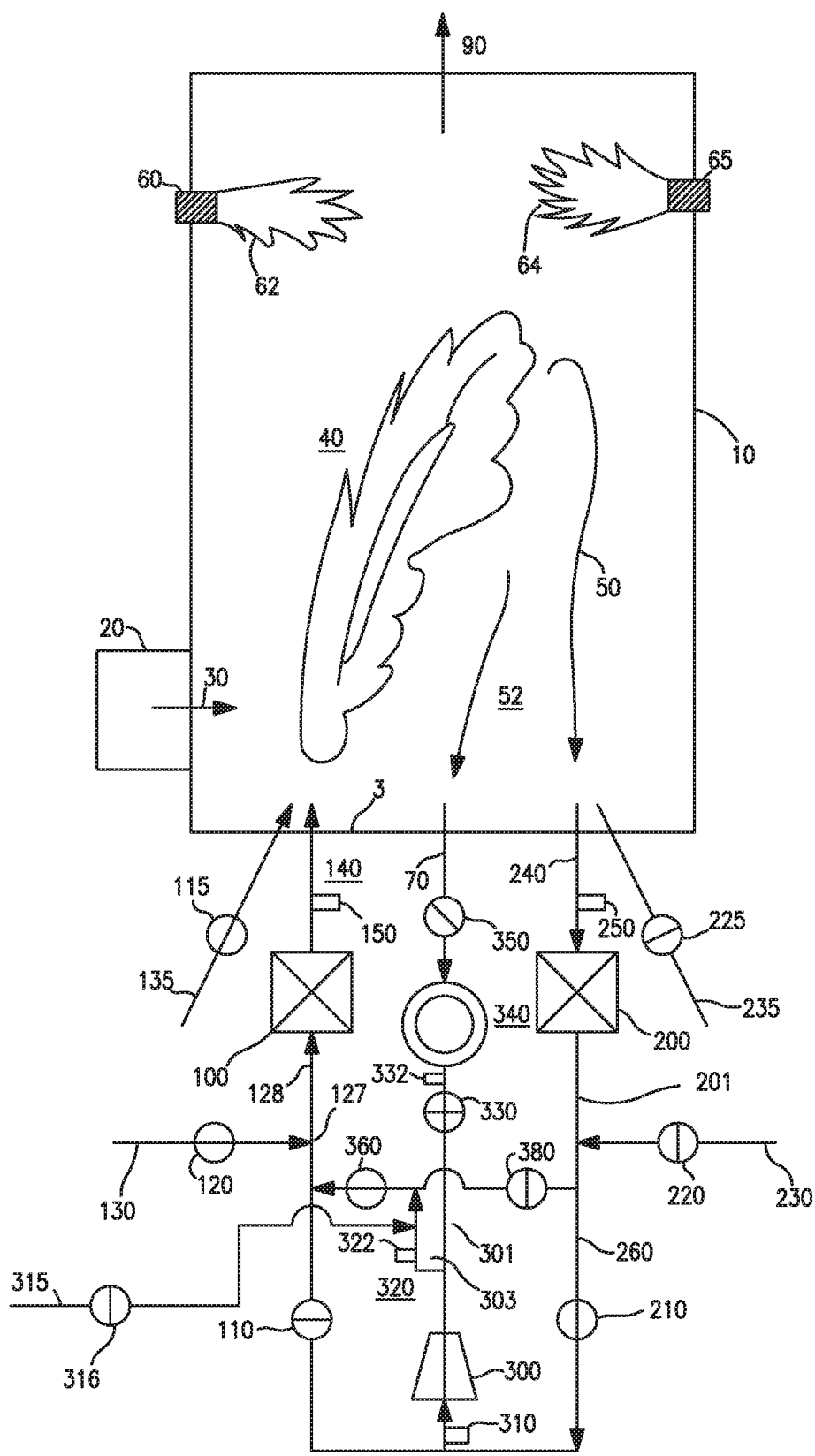
FIG. 1 is a flowsheet of one heat recovery system with which the present invention can be used.

The present invention is useful with methods and systems that generate high temperatures in a furnace by combustion of fuel and oxidant to heat material (the "charge") in the furnace, and that employ heat recovery components to recapture usable heat from the high temperature gaseous combustion products, where the combustion products and material that is volatilized from the charge upon heating or with chemical reactions with other species within the furnace pass through one or more passageways in the heat recovery components and form solid deposits on the surfaces of the passageways. The fuel can be any combustible material, preferably gaseous or atomized liquid, such as natural gas, or hydrocarbons or mixtures of hydrocarbons. The oxidant can be any pure oxygen or any gaseous composition that contains oxygen, such as air, oxygen-enriched air, or streams containing 50 vol. % to 99 vol. % oxygen.

The charge can be any material that is to be heated in the furnace. Often, the charge is heated to be melted. In other applications, the charge is heated so that it combusts, or so that at least a portion of the charge combusts.

A preferred example of applications with which this invention can be practiced include glassmelting furnaces, in which glass-forming ingredients are melted together to form molten glass. The glass-forming ingredients typically include materials known as "batch", materials known as "cullet", or both batch and cullet. Examples of batch materials include silica sand, soda ash, limestone, dolomite, other carbonates, sulfates, oxides and hydroxides of one or more of sodium, calcium, magnesium and potassium. Cullet is typically pieces of glass, usually formed by breaking and subdividing of recycled glass and glass articles. This invention is useful in furnaces used to melt glassmaking materials because the heat that is generated to melt the glassmaking materials creates a furnace temperature (typically 1500 C to 1600 C) that is sufficiently high to cause alkali compounds present in the molten glass that is formed and/or present in the heated glassmaking materials to volatilize directly, or to react with water vapor or other species in the furnace atmosphere, thereby in both mechanisms to enter the gaseous atmosphere in the furnace, forming gaseous alkali vapor species such as NaOH and KOH. In borosilicate glass melting furnaces the predominant alkali vapor species is sodium metaborate ($NaBO_2$). When the hot flue gas containing alkali vapors exits the furnace and enters the regenerator, the flue gas cools down in the checker passageways by transferring heat to checker material, where they react with compounds such as sulfur oxides, oxygen and carbon oxides that are present in the furnace atmosphere, forming compounds such as sodium sulfate, potassium sulfate, sodium carbonate, potassium carbonate, and the like. These compounds condense onto interior surfaces of the passageways within the heat recovery components, and eventually solidify as solid deposits which continue to grow and thereby restrict the size of the cross-sectional area through which gaseous streams can pass. The problem is made worse by the tendency of finely divided solids to be carried over from the furnace interior into the passageways where they adhere to the deposits.

Other examples of systems with which the present invention is useful include cement kilns, in which feed material typically including silica sand, limestone, and clay, which serve as sources of alkali and alkaline reactants, is heated to a high enough temperature so that the feed material reacts and fuses into cement clinker comprising alkali silicates and alkali aluminosilicates and aluminoferrites. As with glass-melting furnaces, the high temperatures volatilize alkali matter which leaves the kiln in the stream of gaseous combustion products and interacts in the passageways of heat recovery components to form the aforesaid deposits on interior surfaces of the heat recovery components.

Additional examples of systems with which this invention is useful include kilns for manufacturing cement, and incinerators that burn materials containing alkali species.

Figure 6:
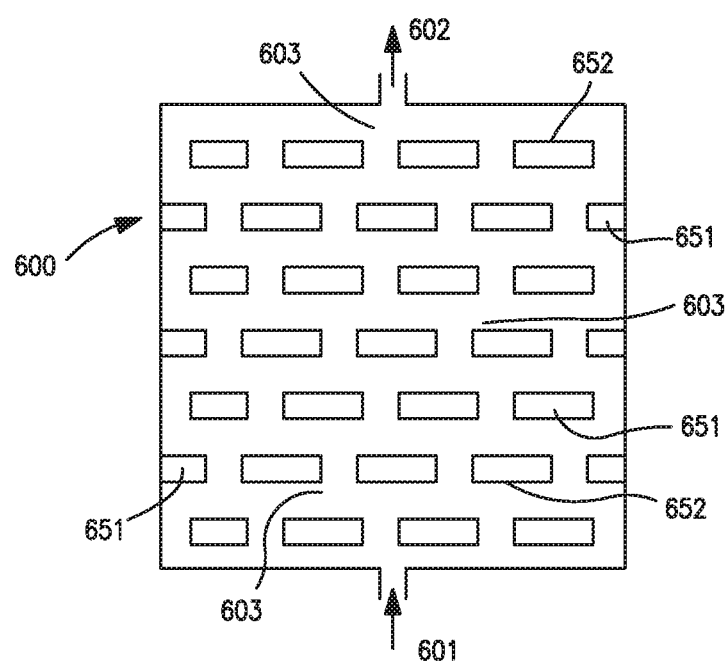
FIG. 6 is a cross-sectional representation of a regenerator with which the present invention can be practiced.

The aforementioned regenerators are one type of heat recovery device with which the present invention is useful. FIG. 6 schematically represents a regenerator (600) having an inlet (601), an outlet (602), and passageways (603) through which gas can flow between inlet (601) and outlet (602). Regenerator (600) includes solid material (651) such as checkerwork, ceramic balls, or other material which can store heat from hot gas passing through, for subsequent transfer to another gaseous stream that passes through it in a subsequent stage of operation. The solid material (651) has surfaces (652) on which deposits can form as described herein.

Figure 7:
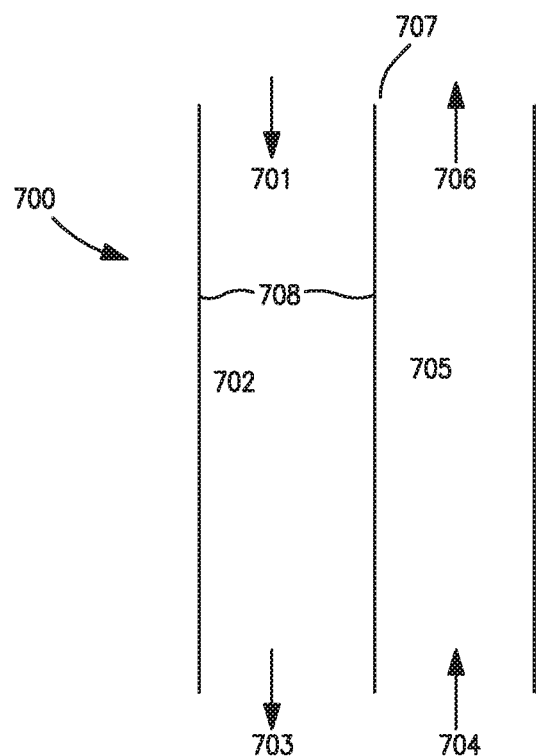
FIG. 7 is a cross-sectional representation of a recuperator with which the present invention can be practiced.

Other heat recovery devices with which the present invention can be practiced include recuperators. FIG. 7 schematically represents a type of recuperator (700) in which one gas stream enters at inlet (701), passes through passageway (702) and exits at outlet (703), and another gas stream enters at inlet (704), passes through passageway (705), and exits at outlet (706). One of these gas streams is hotter than the other, and heat flows from that stream through barrier (707) to the other stream. Barrier (707) has surfaces (708) on which deposits can form as described herein.

Figure 8:
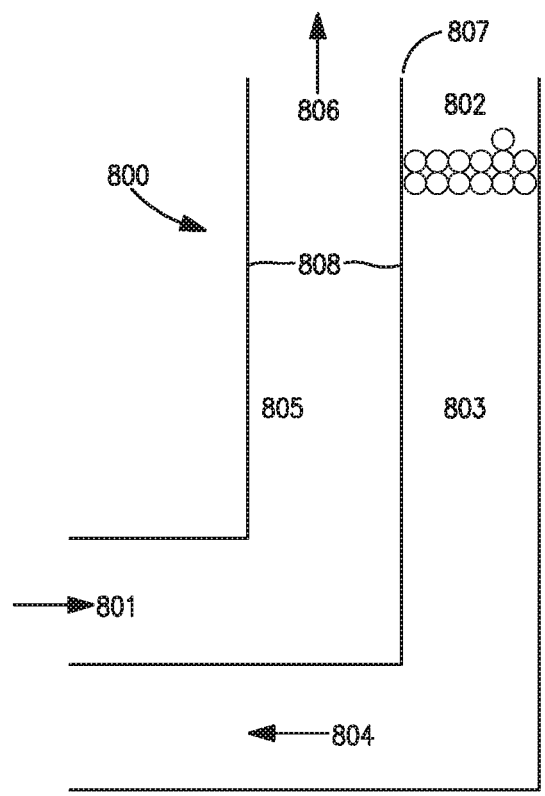
FIG. 8 is a cross-sectional representation of a batch/cullet preheater with which the present invention can be practiced.

Another type of heat recovery device with which the present invention can be practiced includes equipment known as batch/cullet preheaters. This type of heat recovery device is represented in FIG. 8 as (800), in which batch and/or cullet material (802) to be fed into the glassmelting furnace is fed into a passageway (803) of the preheater (800) and moves in the direction indicated by the arrow, exiting at outlet (804), while gaseous combustion products exiting from the furnace enter at inlet (801), flow through passageway (805), and pass out at outlet (806). Heat passes from the gaseous combustion products through barrier (807) to the incoming batch/cullet material. Deposits can form as described herein on surface (808) of barrier (807). In such equipment, the barrier is being heated by the hot gaseous stream even though it does not store heat for subsequent heating of another stream.

During the stage in which gaseous combustion products are flowing through the passageways, containing materials that form deposits on interior surfaces of the passageways, the temperatures of these surfaces typically are at least 600 C. The surface temperatures can even be above 800 C, especially if the surfaces are made of ceramic or other nonmetallic refractory material, whereas the surface temperatures are typically 800 C or below 800 C if the surfaces are made of metallic material.

Any of the foregoing types of heat recovery devices have interior surfaces which are in contact with the gaseous streams exiting the furnace, and are therefore susceptible to deposits being formed on the surfaces. In operations in which the deposits have formed on surfaces of the heat recovery components, the present invention removes the deposits being formed. It is preferred to remove all deposits, but the methods described herein can be effective to achieve partial removal of deposits which is still better than letting deposits remain and grow in the passageways.

To put into practice the removal of deposits, one first should discontinue the flow through the passageways of gaseous streams having the tendency to form deposits. This can be effected by closing suitable valves that are positioned either between the furnace and the heat recovery component that has the deposits to be removed, or at the other end from which the gaseous combustion products pass out of the heat recovery component. Preferably, the gaseous combustion products present within the passageways should be exhausted out of the passageways in a period of time after new flows into the passageways have ceased, and before flows of reducing gas into the passageways as described herein have commenced.

Then a gaseous reducing stream is flowed into and through the passageway whose surfaces contain deposits to be removed. This flow is in the opposite direction relative to the flow of those gaseous combustion products. i.e., from the colder end of the passageway to the hotter end of the passageway. The gaseous reducing stream comprises one or more oxidizable compounds. Preferred components of the gaseous reducing stream include hydrocarbons of the formula $CH_4$ or $C_nH_p$ where n is 2 to 6 and p is (2n+2) or 2n. Other preferred components include hydrogen, carbon monoxide, chlorine, HX where X is a halide, and boron-containing gases such as $B(OH)_3$ and $HBO_3$. The gaseous reducing stream may also contain solids which are reducing in nature, such as soot, which forms gaseous reducing compounds such as carbon monoxide in-situ. The gaseous reducing stream can be syngas or other compositions typically a mixture of carbon monoxide and hydrogen, produced by a steam-methane reformer or similar reactor.

The gaseous reducing stream should be flowed under conditions such that contact between the gaseous reducing steam and the deposits occurs at temperatures of at least 500 C, preferably at least 600 C, more preferably at least 800 C, up to 1200 C or up to the limit of tolerance for the material from which the passageway and the heat recovery component are made. The reducing gas steam exiting the regenerator top should preferably be at least 900 C, more preferably at least 1000 C, and most preferably at least 1100 C. These temperature conditions may be achieved by preheating the deposit laden regenerator firstly before injecting the reducing gas for regenerator cleaning. If the reducing gas stream is produced by a separate device and has temperatures higher than 350 to 400 C, the reducing gas stream exiting from the top of the preheated regenerator may have a temperature higher than 1100 C; in this case the regenerator cleaning time may be shortened.

The regenerator passageway with deposits may be preheated to a higher desired temperature before the introduction of the fuel for cleaning. As an example, the regenerator may be preheated for two full flue gas cycles (about 40 min.) followed by a cleaning cycle (20 min.). In this case, the checkers and passageway walls in the regenerator will have higher temperatures than normal but could be still within the permissible temperature limits. A regenerator preheated to a higher optimum temperature will accelerate the removal of the sulfate deposits during the cleaning process of this invention.

The flow of the gaseous reducing stream is continued for a length of time effective to remove deposits, preferably to remove all deposits. This length of time can be determined by observation, by inspecting the interior of the passageways between steps of this method, or by calculation based on the composition of the deposits and the composition of the gaseous reducing stream.

The interaction between the deposits and the gaseous reducing stream produces gaseous byproducts which typically include NaOH, NaCl, Na vapor, KOH, KCl, potassium vapor, and/or NaBO2 (depending of course on what components are present in the reducing stream). The interaction also weakens or eliminates the ability of the deposits to remain adhered to the surfaces of the passageway, so that some material that had been part of a deposit attached to a surface is loosened or removed and falls instead to the bottom of the passageway where it can be swept out or blown out on periodic inspection and cleaning of the equipment. Thus, the present invention is considered to remove deposits from surfaces regardless of the mechanism, that is, whether the material in the deposits is consumed by chemical reaction, or is loosened and falls off of the surface.

The flow of the gaseous reducing stream and its interaction with the deposits creates a gaseous byproduct stream which is passed out of the passageway. Since the flow direction of the gaseous reducing stream is from the cold end to the hot end of the passageway, gaseous byproducts do not re-condense in the passageway once they are formed from the deposits. This byproduct stream is preferably passed into the furnace wherein combustible components of the product stream are combusted. These components may include products formed by interaction of the reducing stream with the deposits, and may include products that were in the reducing stream as fed into the passageway but did not interact with the deposits.

The gaseous reducing stream can be from any of several sources, and the components of a reducing stream that is a combination of components can be from one or several different suitable sources. One type of source is a separate supply of the gas or gases that comprise the reducing stream. For instance, the separate supply could be via a pipeline from another industrial operation that produces the components, such as a feed line from a natural gas pipeline or from a steam reforming reactor that produces syngas (typically a mixture of hydrogen and carbon monoxide). The separate supply could be a line from a supply tank that is periodically replenished with the product or products that comprise the reducing gas.

The reducing gas stream for deposit removal can also be produced either in-situ within the heat recovery device or by an external device. For example, partial oxidation of natural gas in a combustor may generate satisfactory reducing gases for the purpose. In partial oxidation, fuel is combusted with a less than stoichiometric amount of oxygen. This would produce reducing gases such as H2, CO and soot together with unburned fuel species. The temperature of the reducing gases produced by partial oxidation varies with the extent of the oxygen deficiency for combustion and the compositions of the oxidant used for partial oxidation. A partial oxidation burner can be placed in the bottom space under the checker pack of a regenerator to produce reducing gases in-situ, or an external partial oxidation combustor can be used. Externally produced reducing gases can be fed directly into the bottom of a preheated regenerator. The partial oxidation combustor is preferred to be well-insulated to minimize the loss of heat from the hot reducing gases produced.

The reducing gas could also be produced in a stage of the same overall combustion system with which the present invention is employed. For instance, some of the gaseous combustion products could be converted to syngas which is then used as the reducing gas stream that is fed into a passageway to remove deposits that are attached to surfaces of the passageway. One type of this class of heat recovery systems with which the present invention can be used is referred to as thermochemical regeneration, or TCR, and is described as follows with reference to FIGS. 1, 2 and 3.

This heat recovery process proceeds in two cycles, which are referred to herein as the flue cycle and the reforming cycle. These two cycles are performed alternatingly in two or more checker-filled regenerators or by using a rotating checker pack with two separate gas passages (not shown). The heat recovery process is preferably carried out in association with furnaces and other combustion devices which employ "oxy-fuel" combustion processes, i.e. combustion of fuel with gaseous oxidant comprising an oxygen content of at least 50 vol. % oxygen, and preferably at least 80 vol. % oxygen, more preferably at least 90 vol. % oxygen, and even at least 99 vol. % oxygen, because the flue gases produced by oxy-fuel combustion have higher H2O and CO2 concentrations, both of which promote the endothermic reforming reactions that are utilized in the method of this invention. During the flue cycle, the checkers in a first regenerator extract and store heat from a high temperature flue gas which is fed from the furnace into and through this regenerator. Then, in the reforming cycle, from the cooled flue gas that exits the first regenerator, a portion (which is referred to herein as Recycled Flue Gas or RFG) is fed into another (second) regenerator and mixed with a stream of fuel (referred to herein as Reforming Fuel or RF). In the following description, pure methane (CH4) is described as reforming fuel for purposes of illustration. Other satisfactory fuels include any combustible gas, gas mixture, or vaporized liquid fuels including, but not limited to, natural gas, propane, and LPG (liquefied petroleum gas).

In the reforming cycle, the RFG/Reforming Fuel mixture enters the second regenerator in which the checker has already been heated, as described herein, and flows through it towards the furnace. The temperature of the RFG/RF mixture passing through the second regenerator continues to increase by extracting heat from the already pre-heated checker. As the RFG/RF mixture passes through the second regenerator, it reaches a temperature at which reforming reactions begin to occur and continue to occur, producing products including H2 and CO. The reforming reactions are endothermic and the heat needed to promote the reforming reactions is absorbed from the heated checker. The gaseous composition that is produced by the reforming reactions typically comprises one or more components such as H2, CO, unreacted gases comprising H2O, CO2, CH4, nitrogen, any residual NOx, and soot. The gaseous composition thus produced may also be called "syngas" herein. The syngas emerges from the second regenerator into the furnace and is combusted in the furnace with oxidant to provide thermal energy for heating and/or melting material in the furnace.

After a length of time, the operation of the two regenerators is reversed, i.e., the regenerator that was used in the flue cycle is switched to the reforming cycle, and the regenerator that was used in the reforming cycle is switched to the flue cycle. After a further period of time, the operation of the two regenerators is reversed again. The timing of the reversals can be determined by elapsed time, or by other criteria such as the temperature of the flue gas exiting from the first regenerator that is in flue cycle. The reversal process is carried out according to a predetermined mechanism and plan, wherein valves are sequenced to open and close based on specific timings.

The operation and control of the present invention is described below in conjunction with FIGS. 1 to 3. An end-port fired glass furnace (10) fitted with two regenerators in end wall (3) is used as an example. However, the operation described herein of a pair of regenerators can be carried out in the same manner when the pair of regenerators are side by side on one side of furnace (10) or are positioned on opposite sides of furnace (10).

As shown in FIG. 1, end-port glass furnace (10) has a feed station (20) where feed material (30) comprising solid glassmaking materials (known as batch and/or cullet) are charged into the furnace to be heated and melted. The flow of molten glass out of furnace (10) is represented as (90). The furnace (10) is equipped with first regenerator (100) on the furnace left side and second regenerator (200) on the furnace right side. Vertical cross-sectional views of the two regenerators are displayed in more detail in FIGS. 2 and 3.

Figure 2:
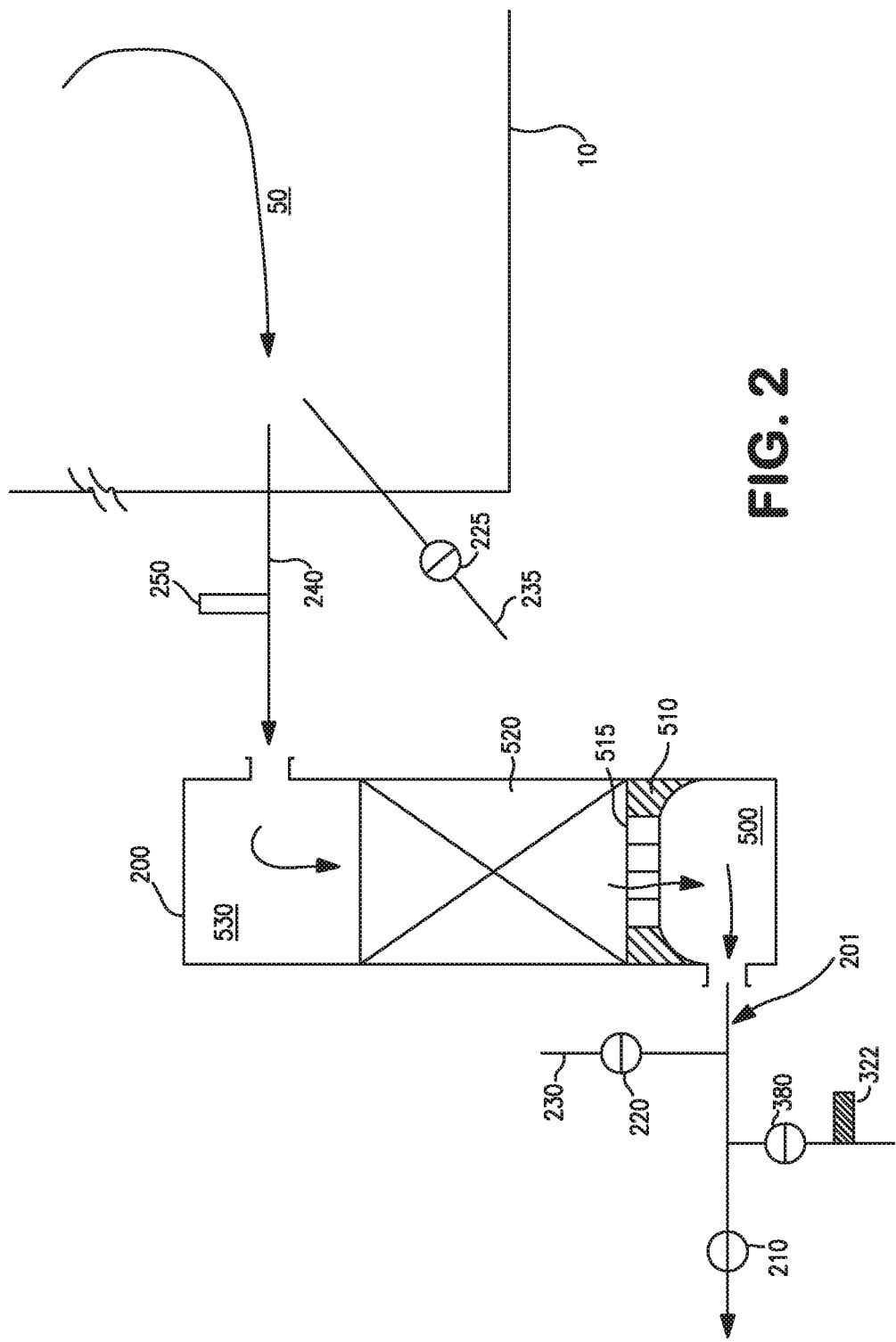
FIGS. 2 and 3 are views of components of the system shown in FIG. 1.

As seen in FIG. 2, regenerator (200) is in the flue cycle wherein flue gas stream (50) from the interior of furnace (10) enters port neck (240) and then flows to the top space (530) of regenerator (200) past an oxygen analyzer (250). The flue gas stream heats checkers (represented as (520)) as it flows through passages between the checkers within regenerator (200), and enters chamber bottom space (500) through gas passages (515) supported on arch (510) which also supports the weight of the whole bed of checkers. This flue gas stream can form deposits on the checkers, by interaction of alkali vapor species and other components of the combustion products, as described herein.

As seen in FIG. 1, a portion (52) of the flue gases produced in furnace (10) may be by-passed to conduit (70) (for instance, if it is desired to control the regenerator from becoming too hot) through a partially opened valve (350) then enters stack (340) to exhaust, by which is meant that it does not re-enter the furnace but instead is discharged to the atmosphere and/or conveyed to one or more other stations for storage and/or further treatment or any combination of such destinations. For maximum heat recovery, it is preferred that valve (350) is closed so that essentially all the furnace flue gas goes to regenerator (200) as flue gas stream (50).

As seen in FIGS. 1 and 2, the cooled flue gas stream (201) exits the regenerator (200) in conduit (260), passes through an open valve (210) and oxygen sensor (310), and then enters the suction-side of blower (300). The majority of the flue gas (301) leaving the pressure-side of the blower passes through a damper (330) then a flow meter (332), and finally is directed into stack (340) through which this flue gas leaves the system to exhaust as defined herein. A portion (303) of the flue gas is recycled to the bottom of regenerator (100) by passing through conduit (320) and valve (360). This is Recycled Flue Gas (RFG). Its flow is metered by a flow meter (322). Reforming fuel which is to be fed to the second regenerator (100) is supplied by a conduit (130) through valve (120).

Figure 3:
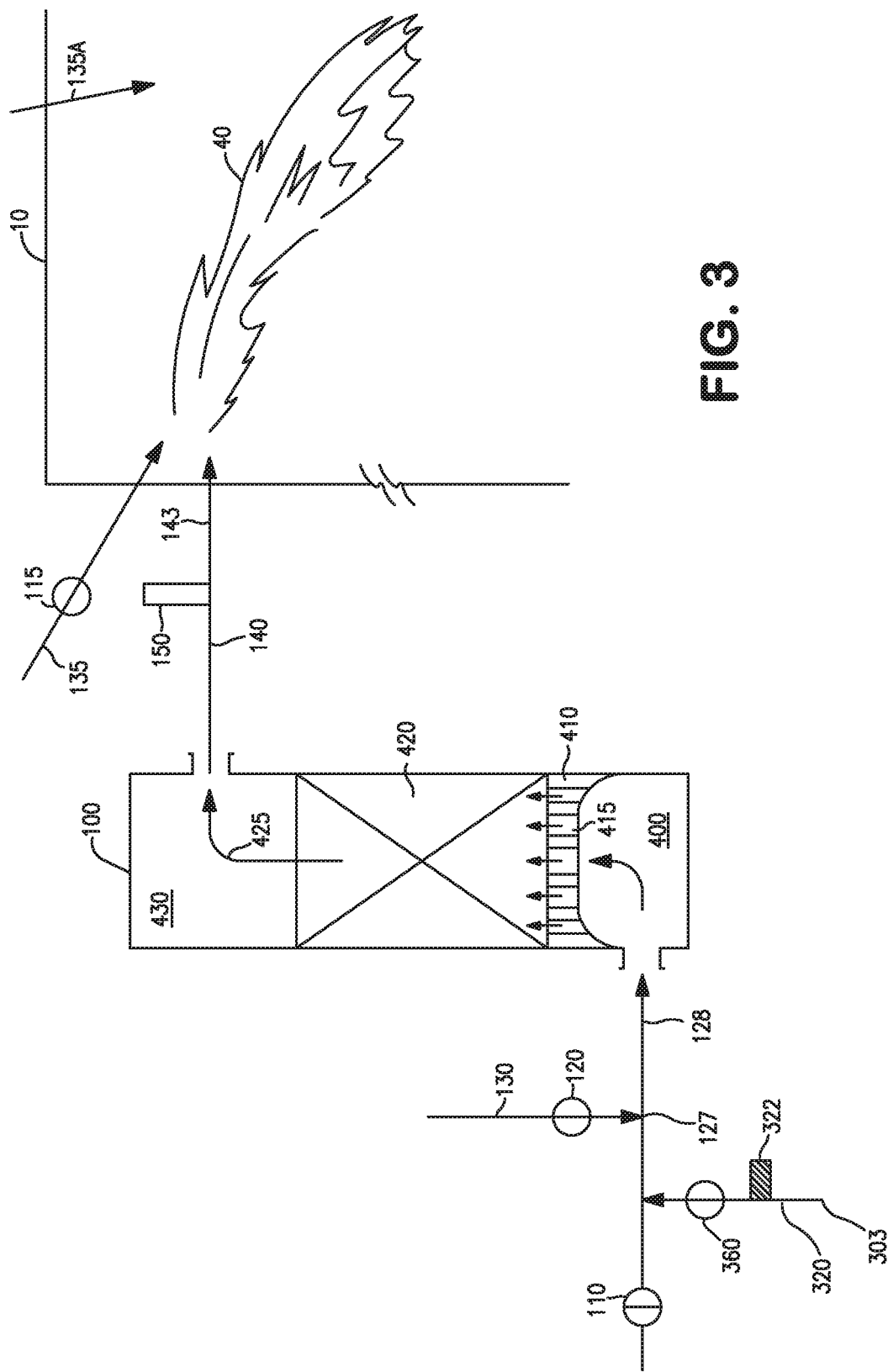

As seen in FIG. 3, the reforming fuel (RF) from stream (130) intersects and mixes with the RFG (303) at location (127) in conduit (128) which also communicates with the bottom space (400) of regenerator (100). This RFG/RF mixture enters the already pre-heated checker pack (420) of regenerator (100) through gas passages (415) on arch (410). This mixture of fuel and recycled flue gas can function as the gaseous reducing stream that is described herein to cause removal of deposits from surfaces in the regenerator. Regenerator (100) has already been heated in a previous cycle by passage of flue gas from the furnace into and through the regenerator (100). The temperature of the RFG/RF mixture increases as it flows through the checker pack of regenerator (100). When the temperature of the RFG/RF reaches reforming temperature, endothermic reforming reactions occur in which the reforming fuel (e.g. CH4) reacts with CO2 and H2O in the RFG and forms CO, H2, and some soot. The required heat for the endothermic reforming reactions is taken from the heated checkers. The reforming reaction continues as the RFG/RF mixture continues to travel toward the top space (430). This mixture of RFG/RF also interacts with deposits to cause them to be removed from the surfaces within the regenerator.

The gaseous stream (425) (referred to herein as a "reformed" or "syngas" gas stream) exits from the top of checker pack (420). Stream (425) has high temperature and includes species such as CO, H2, soot, unreacted CH4, and unreacted CO2 and H2O (as well as nitrogen and any residual NOx). The syngas stream (425) passes through port neck (140) and oxygen sensor (150), and enters furnace (10). The syngas stream exits checker pack (420) at temperatures for example ranging from 1800 F to 2500 F. This syngas is combusted in the furnace (10) represented as flame (40) to generate additional heat of combustion useful for heating and/or melting material in the furnace, such as glassmaking materials. Oxidant required for combustion of the syngas is supplied by a conduit (135) through opened valve (115). This oxidant can be air, or it can have an oxygen content higher than that of air, i.e. at least 21 vol. %, and preferably equal to or higher than 80 vol. %, more preferably equal to or higher than 90 vol. %, or even at least 99 vol. %.

Typically, the heat recovery process proceeds with one regenerator in the flue cycle and one regenerator in the reforming cycle, as seen in FIG. 1, for about 20 to 40 minutes or until the checkers in the reforming regenerator are too cold to provide sufficient heat to promote the desired endothermic chemical reactions. At that point, and now continuing with the description herein where regenerator (200) was in the flue cycle and regenerator (100) was in the reforming cycle, furnace (10) undergoes reversal in which regenerator (200) is transitioned to the reforming cycle for heat recovery and regenerator (100) is transitioned into the flue cycle for heat accumulation. Before the reversal, remaining syngas in regenerator (100) is to be purged to furnace (10). In this instance, reforming fuel supplied to the regenerator is terminated at first by closing valve (120) while letting the flow of RFG from blower (300) continue. During purging, the RFG flow rate may be increased to shorten the time required for purging to be completed. Remaining syngas in regenerator (100) is purged by the RFG for a specified amount of time so that nearly all the syngas in the regenerator is expelled to the furnace and combusted to completion.

Upon reversal, the flue gas from the furnace passes through regenerator (100), and a portion thereof passes to exhaust (as defined herein) while a portion or the balance is mixed with fuel and the mixture is passed through regenerator (200) and into the furnace. The flue gas now can lead to formation of deposits within passageways of regenerator (100), as described herein. Valve (110) which had been closed is opened, valve (210) is closed, and valve (360) is closed and valve (380) is opened, to permit heated flue gas to pass from regenerator (100) toward and through blower (300), and to permit a portion (303) of this flue gas to pass into regenerator (200) after it is mixed with reforming fuel (230) which enters through valve (220) which had been closed but now is opened. Valve (115) which had been open is closed, and as no combustion aided by oxidant through valve (115) occurs in this phase, and valve (225) is opened. The resulting mixture of reforming fuel and recycled flue gas undergoes in regenerator (200) the endothermic reactions which had occurred in regenerator (100) in the previous cycle as described herein, to produce syngas (425) which passes into furnace (10) where it is combusted with oxidant (235) that is fed through valve (225). This mixture of reforming fuel and recycled flue gas also functions as the gaseous reducing stream to cause deposits to be removed from surfaces within the regenerator (200).

During the heat recovery process, furnace (10) may be co-fired with other burners such as (60) and (65) such that both syngas flame (40) and burner flames (62) and (64) co-exist. In addition, burners (60) and (65) may or may not be firing during the reversal process when the reforming regenerator (100) or (200) as the case may be is undergoing the purging sequence described above. For maximum heat recovery, it is preferred that burners (60) and (65) are not co-firing with the syngas flame (40). It is also preferred that during the purging sequence, burners (60) and (65) are not firing.

In the practice of this invention, reformed gas stream (425) can be used to make up the reducing gas stream that is passed into any other passageway that contains interior surfaces to which deposits are attached. Alternatively, the stream in conduit (128) that is formed by combining fuel and recycled flue gas, can be used to make up the reducing gas stream that is passed into any other passageway that contains interior surfaces to which deposits are attached.

The present invention provides several advantages. For instance, this invention does not incur loss of glass melting energy during the regenerator cleaning process, nor does it invite any concerns of higher flue gas temperatures leading to downstream equipment during the cleaning process. In effect, the invention can be seamlessly integrated into a regenerative heat recovery system as describe herein. In addition, this invention also allows regenerators to be made smaller but with equal heat recovery efficiencies as those of the larger ones which do not have the benefits of this invention. Smaller regenerator construction is achieved by reducing the dimensions of a checker's gas passage and keeping the checker's wall thickness the same or thinner. When the dimensions of a checker's gas passage and/or the checker wall thickness are reduced, the overall size of the checker becomes smaller. A smaller regenerator thus can pack the same amount of checker materials by weight to store the same amount of heat as that of a larger checker can during the flue cycle. The internal surface area of checker per unit volume of regenerator increases as the dimension of the checker's gas passage is decreased, which allows a shorter cycle time for heat transfer. With a shorter cycle time the required amount of heat stored per cycle is reduced, which reduces the required weight of checker. In this way the dimensions and the weight of checker can be reduced by using a shorter cycle time, a smaller passageway and a thinner checker wall thickness. However, a checker with smaller gas passage is also prone to plugging by sulfate deposits and, for this reason, huge regenerators with checker passage dimensions of 100 to 150 mm have been used for glass furnace applications for over 100 years. This invention permits periodic cleaning of the smaller checkers to avoid the blockage by deposits and enables a substantial size and capital cost reduction for glass furnace and other furnace applications.

For example, a typical cruciform or chimney block checker has a characteristic length for its gas passage in the order of 150 mm and a wall thickness of 30 mm or 40 mm. With this invention, the characteristic length of the gas passage may be reduced to about 75 mm, and more preferably reduced to equal to or less than 50 mm. If an original checker's gas passage is 150 mm square and 30 mm in wall thickness, the checker's cross-sectional dimension is 210 mm×210 mm. If the checker's gas passage is reduced to 45 mm square, the cross sectional dimension of the smaller checker is 105 mm×105 mm. Assuming the heights of both checkers are the same, the volume fraction of checker materials in the original larger checker is 0.49 and that of the smaller checker is 0.82. Therefore, for the same weight of checker material, the outer dimensions of the checker pack in a regenerator may be reduced by a factor of $(0.82/0.49)^{1/3}=1.19$. It is noted here that a smaller checker gas passage also increases pressure drops of the gases passing through the checker, so a detail design calculation is necessary for an overall smaller regenerator which uses the essence of this invention.

On the other hand if the size of a regenerator is kept the same and the smaller checker is used, the heat recovery efficiency of the regenerator increases due to more checker weight and the surface area in the regenerator. A smaller but equal capacity regenerator may save capital costs for building the regenerator and also reduce regenerator purging time thus more energy may be recovered.

The invention is illustrated in the following examples.

Example 1

With reference to FIGS. 1, 2 and 3, a thermochemical heat recovery system (TCR) having similar process components as described in FIG. 1 was installed in an oxy fuel fired, nominally 50 metric ton per day (tpd) end-port glass furnace. Reformed gas (425) passes through regenerators (100, 200) cyclically every 20 minutes during the TCR heat recovery process. The reformed gas stream comprises CO, H2, CO2, H2O, soot, CH4, and other unburned or fragmented hydrocarbon species thus is reducing. The reformed gas exits the top space (430) of regenerator in reforming (100) at approximately 1100 to 1150 C. At two points during an experimental campaign of operation of this system, operation was stopped and the interiors of the regenerators were visually inspected. The inspections revealed that amounts of loose powdery sulfate solids were at the bottoms of the regenerators, and no deposits were adhered to the interior surfaces of the regenerators that had been exposed to passage of gas through them.

Not to be bounded or limited by any theories, these observations are consistent with the mechanism in which sulfate deposits formed on the surfaces in the heating cycle were removed by chemical reactions with one or any combinations of reducing species in the reducing gas stream such as CO, H2, unburned fuel, fuel fragments, and soot. For example, sodium sulfate (Na2SO4) deposit may react with the reformed gas stream to form reaction products comprising NaOH vapor, SO2, H2, and CO2 gases in the preheated regenerator. Although the fundamental reaction mechanisms are not yet clear, some possible reactions between the reformed gas stream and the sulfate deposits may be written globally, for example, as CO+Na2SO4+H2O→CO2+SO2+2NaOH; and C+Na2SO4+2H2O→CO2+SO2+2NaOH+H2.

Example 2

Figure 4:
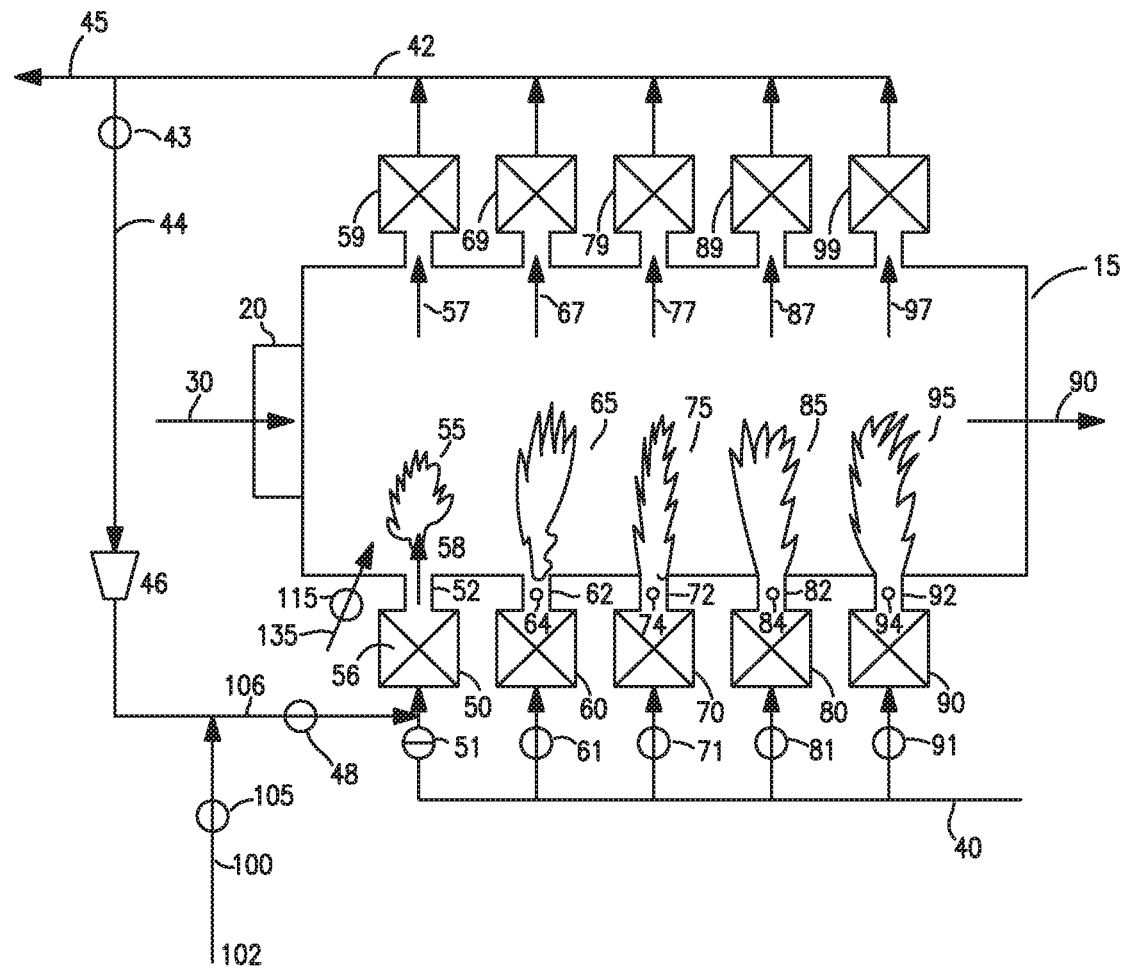
FIG. 4 is a flowsheet of an alternative embodiment of the present invention.
Figure 5:
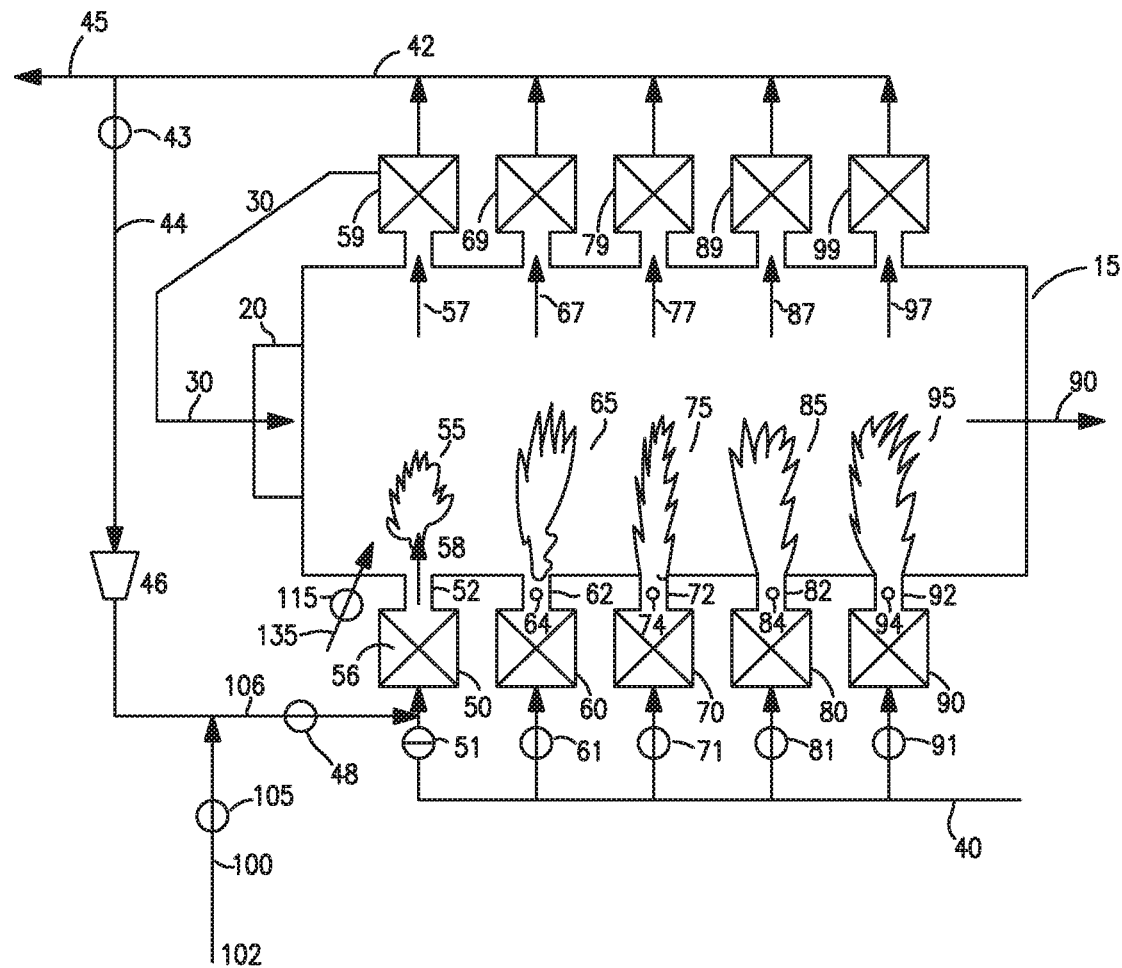
FIG. 5 is a flowsheet of another alternative embodiment of the present invention.

This example illustrates the application of this invention to a five-port, cross-fired glass furnace shown in FIGS. 4 and 5.

A cross-fired glass furnace (15) has five firing ports on each side and a charger (20) for supplying batch/cullet (30) materials for glass melting. Glass melt (90) flows towards the fore hearth section. It was found that checkers (56) in the first regenerator on the right (50) are partially clogged by sulfate deposits to a degree that a maintenance cleaning is warranted. In this scenario, the other four regenerators on the right (60, 70, 80, 90) can continue normal operation by keeping valves (61, 71, 81, 91) open for preheating the combustion air or other gaseous oxidant supplied from conduit (40). The combustion air or other oxidant is preheated by heat stored in the regenerators in a previous cycle in which hot combustion products were passed from the furnace through those regenerators. Fuel fed from underport fuel jets (64, 74, 84, 94) mixes with the preheated combustion air (or other gaseous oxidant) near the exits of port necks (62, 72, 82, 92) and form flames (65, 75, 85, 95) in the furnace for glass melting. Hot combustion gases (57, 67, 77, 87, 97) exhaust into and through the regenerators on the left (59, 69, 79, 89, 99) for heating checkers and the resulting cooled flue gas is then collected in a common conduit (42). The majority of the furnace flue gas flows through conduit (45) for further downstream treatment then exhausted into the atmosphere.

Air supply to the first regenerator on the right (50) is disconnected by closing valve (51) at the regenerator bottom. Some of the furnace flue gas is recycled through a conduit (44) by a blower (46) with valve (43) open. This recycled flue gas (RFG) is mixed with a fuel (102) supplied from conduit (100) and an open valve (105). This fuel for regenerator cleaning may or may not be the same type of fuel that is combusted at the other four regenerators (60, 70, 80, 90) and/or that is used to remove deposits from those regenerators at other points in the operations. Satisfactory fuels include any combustible gas, gas mixture, or vaporized liquid fuels including, but not limited to, natural gas, propane, and LPG (liquefied petroleum gas). In the following description, natural gas (NG) is described as fuel (102) for purposes of illustration. While any volume ratio of RFG to NG can be utilized effectively in the method of this invention, a preferred ratio of RFG to FG (by volume) is 0.1 to 1.0.

The mixed fuel and RFG stream enters the bottom of regenerator (50) through a conduit (106) and an open valve (48) then travels upward through the preheated regenerator (50), and its temperature increases continuously. Reducing species comprising H2, CO, soot, unreacted fuel, and fuel fragments are formed inside the regenerator by chemical reactions between the fuel (102) and the RFG. These reducing species also decompose the sulfate deposits on the surfaces of checkers (56) and refractory walls of regenerator (50) in situ, by reacting with the sulfate deposits and convert them into gases species.

The reducing gas stream (58), which also contains the species of the vaporized sulfate deposits, is introduced into the furnace from port neck (52) then combusted by an oxidant supplied from conduit (135) with valve (115) open. This oxidant can be air, or it can have an oxygen content higher than that of air, i.e. at least 21 vol. %, and preferably equal to or higher than 80 vol. %, more preferably equal to or higher than 90 vol. %, or even at least 99 vol. %. A flame (55) is formed to liberate the heat content of the reducing gas stream for glass melting.

After furnace reversal (not shown by figures hereafter), the furnace will be fired from the left regenerators (59, 69, 69, 89, 99). Valves (43, 48, 105) are closed to disconnect the supply of RFG and fuel (102); and valve (51) is open to exhaust the hot flue gas through regenerator (50) in order to preheat it for the next cycle of the regenerator cleaning by reactive vaporization of sulfate deposits in regenerator (50).

FIG. 5 shows an embodiment in which (59) represents instead a heat recovery device known as a batch/cullet preheater in which incoming glassmaking material (30) is preheated in unit (59) by indirect heat exchange from the heat of the combustion gases exiting the furnace (15).

Although this example shows the essence of cleaning a clogged regenerator on the first of the right side, those skilled in the art will notice that by installing additional sequence valves which have functions similar in nature to those of valves (43 and 48), any clogged regenerators in addition to regenerator (50) may be cleaned sequentially or in parallel with regenerator (50). This regenerator cleaning method may be integrated into the overall maintenance schedule of the furnace, for example, one at a time of the 10 regenerators may be cleaned every 6-months so that none of the regenerators would impair furnace operation due to clogging caused by sulfate deposits. A preferred cleaning method is to automate the cleaning steps described above by installing the sequence valves in all of the regenerator chambers and conduct short periods of cleaning every day or even every hour to prevent clogging of regenerator passages.

What is claimed is:

1. A combustion method comprising
   (A) combusting fuel and gaseous oxidant in a furnace to generate heat of combustion which heats a charge in the furnace and generate gaseous combustion products which include alkali vapor species,
   (B) passing a gaseous flue gas stream comprising gaseous combustion products from the furnace through a first passageway in a heat recovery device wherein the first passageway has surfaces exposed to the flue gas stream, to heat the surfaces and cool the flue gas stream, and forming liquid or solid deposits on the surfaces by interaction between components of the combustion products, and passing cooled depleted flue gas out of the first passageway,
   (C) discontinuing passage of the flue gas stream through the first passageway and then passing a gaseous reducing stream through the first passageway in the direction opposite to the flow direction of the flue gas stream in contact with said deposits to react the gaseous reducing stream with the deposits and thereby causing removal of deposits from the surfaces and forming in the first passageway a gaseous byproduct stream comprising products of reaction of the deposits with the reducing stream, wherein the gaseous reducing stream is produced by passing a gaseous flue gas stream comprising gaseous combustion products from the furnace through a second passageway in a heat recovery device wherein the second passageway has surfaces exposed to the flue gas stream to heat the surfaces and cool the flue gas stream, passing cooled depleted flue gas out of the second passageway, and combining cooled depleted flue gas from the second passageway with fuel, and
   (D) passing the byproduct stream from the first passageway into the furnace and combusting reducing components in said byproduct stream in the furnace.

2. A method according to claim 1 wherein said heat recovery device is a recuperator, or a regenerator, or a preheater for batch or cullet.

3. A method according to claim 1 said deposits are formed on the surfaces in a temperature range between 600 C and 1200 C.

4. A method according to claim 1 said deposits are formed on the surfaces in a temperature range between 800 C and 1100 C.

5. A method according to claim 1 wherein the gaseous reducing stream comprises one or both of carbon monoxide and hydrogen.

6. A method according to claim 1 wherein said gaseous reducing stream that is passed in contact with said deposits contains at total of at least 10% carbon monoxide and hydrogen by volume.

7. A method according to claim 1 wherein said gaseous reducing stream that is passed in contact with said deposits contains a total of at least 25% carbon monoxide and hydrogen by volume.

8. A method according to claim 1 wherein said gaseous reducing stream that is passed in contact with said deposits contains a total of at least 50% carbon monoxide and hydrogen by volume.

9. A method according to claim 1 and further comprising, after step (D), passing gaseous oxidant through the first passageway to heat the gaseous oxidant, and then passing the heated gaseous oxidant into the furnace.

10. A combustion method comprising
(A) combusting fuel and gaseous oxidant in a furnace to generate heat of combustion which heats a charge in the furnace and generate gaseous combustion products which include alkali vapor species,
(B) passing a gaseous flue gas stream comprising gaseous combustion products from the furnace through a first passageway in a heat recovery device wherein the first passageway has surfaces exposed to the flue gas stream, to heat the surfaces and cool the flue gas stream, and forming liquid or solid deposits on the surfaces by interaction between components of the combustion products, and passing cooled depleted flue gas out of the first passageway,
(C) discontinuing passage of the flue gas stream through the first passageway and then passing a gaseous reducing stream through the first passageway in the direction opposite to the flow direction of the flue gas stream in contact with said deposits to react the gaseous reducing stream with the deposits and thereby causing removal of deposits from the surfaces and forming in the first passageway a gaseous byproduct stream comprising products of reaction of the deposits with the reducing stream,
wherein alternatingly (i) the gaseous reducing stream is produced by (a) passing a gaseous flue gas stream from the furnace which comprises gaseous combustion products including alkali vapor species through a second passageway in a heat recovery device wherein the second passageway has surfaces exposed to the flue gas stream, to heat the surfaces and cool the flue gas stream, and forming liquid or solid deposits on the surfaces in said second passageway by interaction between components of the combustion products, and passing cooled depleted flue gas out of the second passageway, and (b) combining a portion of the cooled depleted flue gas from the second passageway with fuel; wherein the gaseous byproduct stream passed from the first passageway comprises carbon monoxide and hydrogen formed in an endothermic reaction in the first passageway; and (ii) cooled depleted flue gas passed out of the first passageway is combined with fuel and passed into and through the second passageway in contact with said deposits on surfaces in said second passageway, and reacts with the deposits thereby causing removal of deposits from the surfaces, and forms in the second passageway a gaseous byproduct stream comprising products of reaction of the deposits with the reducing stream and comprising carbon monoxide and hydrogen formed in an endothermic reaction in the passageway, and
(D) passing the byproduct stream from the first passageway into the furnace and combusting reducing components in said byproduct stream in the furnace.

11. A method according to claim 10 wherein said heat recovery device is a recuperator, or a regenerator, or a preheater for batch or cullet.

12. A method according to claim 10 said deposits are formed on the surfaces in a temperature range between 600 C and 1200 C.

13. A method according to claim 10 said deposits are formed on the surfaces in a temperature range between 800 C and 1100 C.

14. A method according to claim 10 wherein the gaseous reducing stream comprises one or both of carbon monoxide and hydrogen.

15. A method according to claim 10 wherein said gaseous reducing stream that is passed in contact with said deposits contains at total of at least 10% carbon monoxide and hydrogen by volume.

16. A method according to claim 10 wherein said gaseous reducing stream that is passed in contact with said deposits contains a total of at least 25% carbon monoxide and hydrogen by volume.

17. A method according to claim 10 wherein said gaseous reducing stream that is passed in contact with said deposits contains a total of at least 50% carbon monoxide and hydrogen by volume.

18. A method according to claim 10 and further comprising, after step (D), passing gaseous oxidant through the first passageway to heat the gaseous oxidant, and then passing the heated gaseous oxidant into the furnace.

* * * * *